Nov. 4, 1930.                A. FRIED                 1,780,585
                          CAMERA MOUNTING
                        Filed Nov. 9, 1926          3 Sheets-Sheet 1
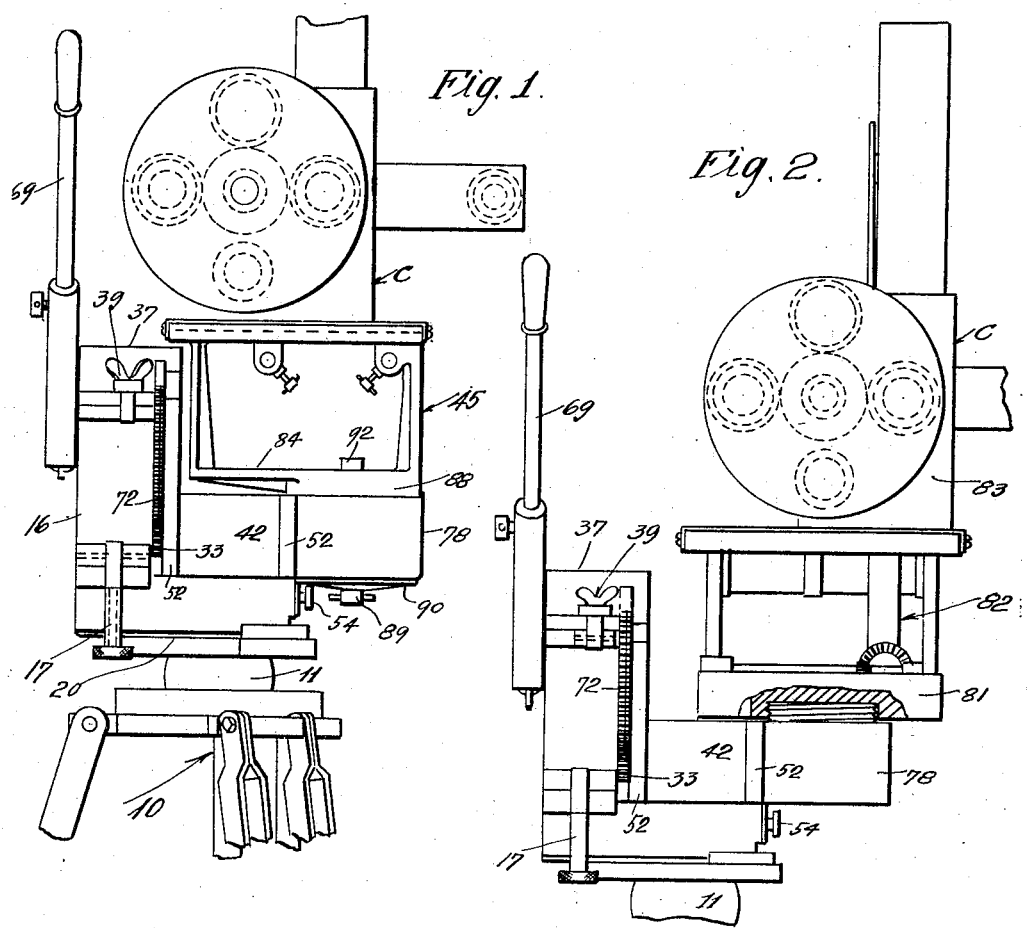
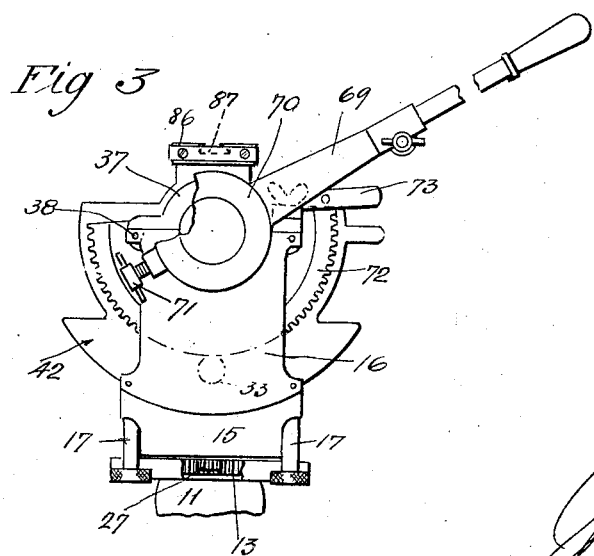
Inventor
Armin Fried
Attorney.

Nov. 4, 1930.   A. FRIED   1,780,585
CAMERA MOUNTING
Filed Nov. 9, 1926   3 Sheets-Sheet 2

Inventor
Armin Fried

Attorney.

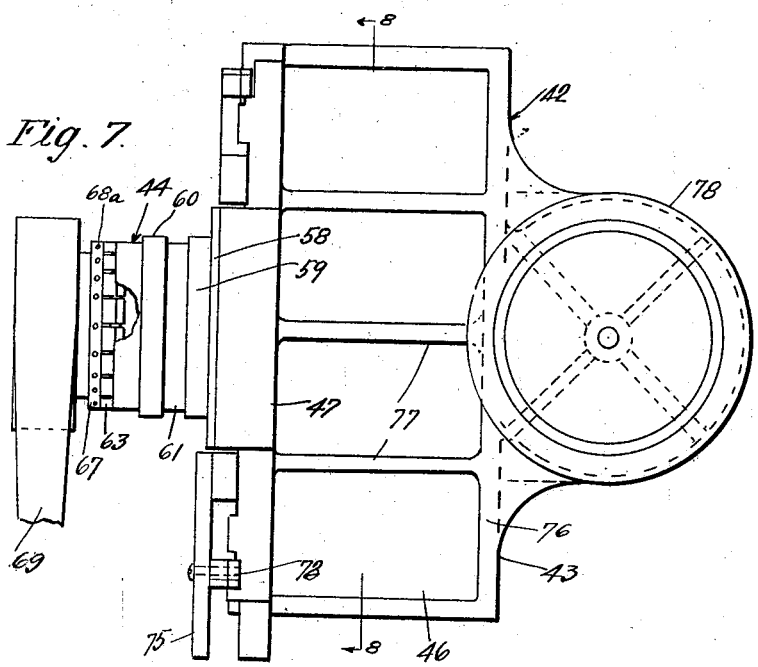
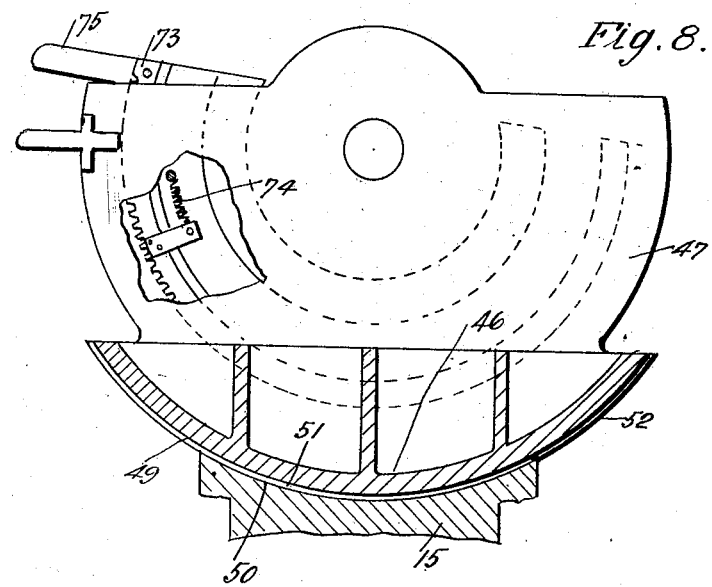

Patented Nov. 4, 1930

1,780,585

UNITED STATES PATENT OFFICE

ARMIN FRIED, OF LOS ANGELES, CALIFORNIA, ASSIGNOR TO WILLIAM FOX VAUDEVILLE COMPANY, OF LOS ANGELES, CALIFORNIA, A CORPORATION OF NEW YORK

CAMERA MOUNTING

Application filed November 9, 1926. Serial No. 147,326.

This invention has to do generally with camera mountings, that is, devices used on top of tripods or stands for holding cameras thereto; and is more particularly concerned with mountings so constructed that the camera may be rotated both about a vertical and horizontal axis and including means for steadying such movement.

It is essential to the taking of good pictures where action is to be "followed" that the movement of the camera be exceedingly steady, as is well known to those skilled in the art. This is particularly difficult of accomplishment when the action moves back and forth before the camera with comparative rapidity, the tendency of the operator being to swing the camera more or less jerkily in order to keep the action always within the field of view. A construction which gives the required steadiness has come into use, and may be generally described as follows: An L-shaped head having one of its arms disposed horizontally and the other disposed vertically, is mounted on a tripod so as to be rotatable about a horizontal axis. Carried by the horizontal arm is a gear train which includes a fly wheel and terminates in a pinion which meshes with a fixed gear or rack on the stationary part of the tripod. It follows, that when the head is swung about its vertical axis, the gear train and fly wheel are revolved by reason of the pinion moving over the rack, the action of the gear train and fly wheel steadying the rotary movement of the head about the vertical axis, for reasons that will be readily understood. The vertical arm of the head carries a similar gear train and fly wheel and also serves as a bearing to support a circular camera which is provided with an axial, horizontal shaft having bearing in said arm. On the camera and concentric therewith is a gear which meshes with a pinion of the gear train; it following that rotation of the camera is steadied by the operation of the gear train and fly wheel. An operating handle is affixed to the camera so it may be swung about its horizontal axis, the same handle being used for swinging the head, and hence the camera, about the vertical axis, or, of course, the movements may be compounded.

While the above construction is found to function well, the circular camera utilized therewith is not entirely suited to all phases of picture taking. Therefore, it is the general object of my invention to provide an adapter fitted to a head of the nature described above and adapted to take cameras which are better suited to the taking of certain "shots," there also being novelty in the combination of such a head with such an adapter.

The nature of the adapter is such that it is capable of being readily substituted for the standard camera used in connection with this type of head, the substitution being made without the necessity of changing any part of said head. The operating handle is affixed to the adapter and therefore it is unnecessary to mutilate or alter the substituted camera in order to take such a handle, this being a feature of obvious advantage. In contradistinction to the usual assembly in which the circular camera is mounted closely to the bearing in the L-head, when a rectangularly shaped camera is used, it perforce may not be positioned similarly since a camera of the last-mentioned type has no trunnion or shaft adapted to be taken in the head arm. However, my adapter is so fashioned that in spite of the fact that the camera has no direct connection with the head it may be brought to such position that it is fairly close to the vertical arm of the head and so disposed that its center of mass is not undesirably off-set with respect to the vertical axis of rotation of the head. The adapter has such effective longitudinal extent of bearing on the head that even when the camera is considerably off-set with respect to the vertical axis of rotation, the binding effect caused by such over balancing is reduced to a minimum and is not at all objectionable.

A better understanding of the adapter, its features of novelty and objects, will be had from the following detailed description wherein:

Fig. 1 is an elevation of my adapter with one type of connector applied thereto and showing a conventionally illustrated camera in position thereon;

Fig. 2 is a view similar to Fig. 1 but showing a different type of connector in use;

Fig. 3 is a view of Fig. 1 as viewed from the left thereof, but showing no camera in place;

Fig. 7 is a plan view of the adapter detached from the head; and

Fig. 8 is a section on line 8—8 of Fig. 7, being partially broken away to show elements at the far side thereof.

Figure 4:
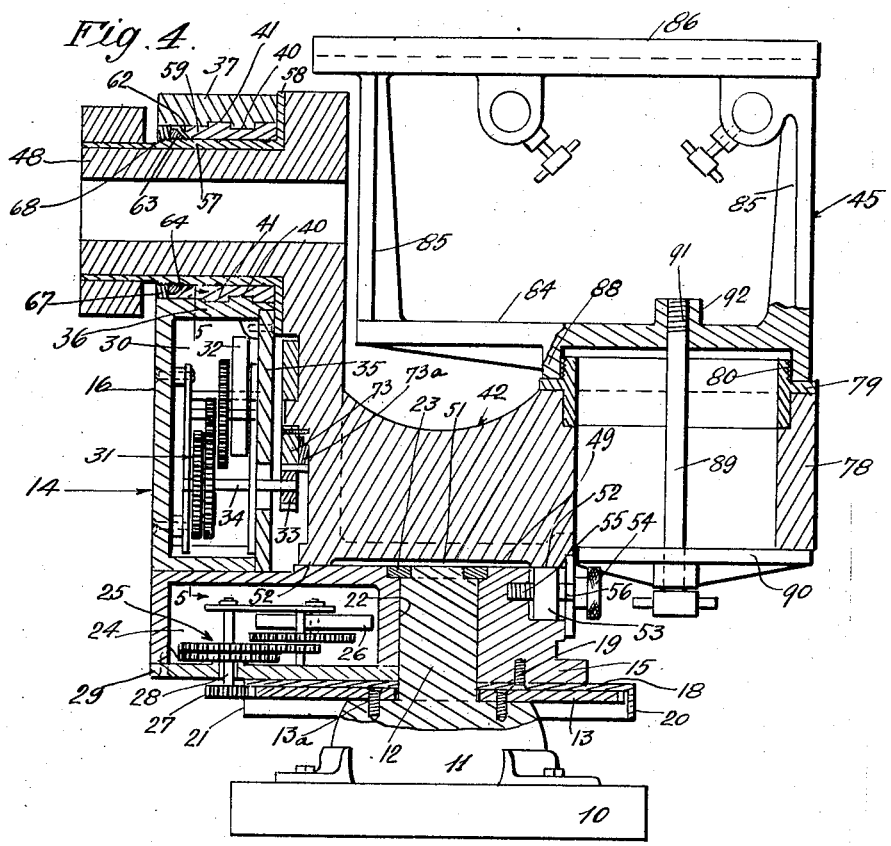
Fig. 4 is a medial section, partly in elevation, through Fig. 1.

I will first describe the general nature of the head with which my device is adapted to be combined.

Numeral 10 designates a tripod to the top of which is clamped a ball member 11 having an upstanding, axial shaft portion 12. A horizontal gear or circular rack 13 is secured to member 11 at 13ª, shaft 12 and gear 13 being concentric. The head member generally indicated at 14 is of L-shaped construction, having a horizontal leg 15 and a vertical leg 16, the vertical leg being detachably clamped to the horizontal leg by clamp screws 17. Plate 18 is secured at 19 to the underside of arm 15 and has an annular depending flange 20 which forms a housing for gear 13, this housing being cut away at 21 for a purpose to be described. Shaft 12 extends through leg 15, having bearing therewith at 22, and a retention nut 23 is screwed on the end of the shaft to hold the head and ball in assembly, though the head, as a whole, is rotatable about shaft 12 which may hereinafter be referred to as defining the vertical axis of rotation. Plate 18 is shown here as having facial engagement with gear 13, though it will be understood that the face bearing may be other than this.

At one side of shaft 12 the horizontal leg is cut away to provide a gear compartment 24, and housed within this compartment is a gear train generally designated at 25 and terminating at one end in a fly wheel 26 and at the other end in a pinion 27, the latter being on the end of shaft 28 which extends through the housing cover 29 and to a point therebelow. Pinion 27 extends through the cut 21 in housing 20 and into mesh with gear 13. It follows that when the head is rotated about shaft 12, the engagement of pinion 27 with the fixed gear 13 causes operation of the gear train and relatively rapid rotation of fly wheel 26. This action steadies the rotation of the head, as will be readily understood, and prevents it from being moved jerkily or being accelerated too abruptly.

Arm 16 is provided with a gear compartment 30 and gear train 31 similar, respectively, to compartment 24 and train 25, except that in this case the gears are arranged to rotate about horizontal axes. Train 31 terminates at one end in fly wheel 32 and at the other end in a pinion 33, the latter being on shaft 34 which extends through compartment cover 35.

The upper end of leg 16 is fashioned to take a trunnion whereby a camera is to be mounted for rotation about a horizontal axis, the box for taking the bearing being of the two-part clamp type, the lower part being an integral portion 36 of the arm and the upper part of the box being a complementary cap 37 which is hinged at 38 to one side of leg 16 and adapted to be clamped in closed position at the other side of the leg by the bolt and wing nut assembly generally designated at 39. Parts 36 and 37 have annular ribs and grooves 40, 41, respectively, whereby the bearing is held against longitudinal displacement, as will be described.

In the usual mounting, the camera, not shown, has a trunnion mounted in a box-held bearing and carries a gear (not shown) concentric with said trunnion and meshing with pinion 33, it following that rotation of the camera about the horizontal axis causes operation of gear train 31, which, in turn, steadies the movement of the camera in a manner well known.

The above somewhat detailed description of the prior art is given so it may be made apparent how my adapter may be substituted for the usual camera and function with the several parts of the head without alteration thereof. In its preferred embodiment, the adapter 42 consists generally of a body portion 43, a trunnion and bearing assembly 44, operating handle 69, and, in some instances, (though not always) a connector 45 intermediate the body portion and the camera C.

Figure 5:
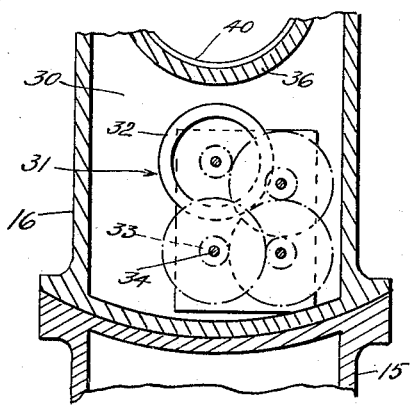
Fig. 5 is a fragmentary section on line 5—5 of Fig. 4.
Figure 6:
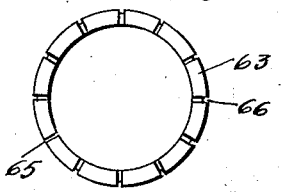
Fig. 6 is a detached side elevation of the adjustable friction collar preferably used in connection with the adapter.

Referring particularly to Figs. 4 to 8, inclusive, it will be seen that body portion 43 is made up of an arcuate base or cradle 46, the side 47 thereof being extended upwardly as shown in Fig. 8 and carrying a trunnion 48, preferably hollow in order to reduce weight, said trunnion and the arcuate face 49 of the cradle being concentric. The curvature of face 49 is complementary to the upper, arcuate face 50 of arm 15, but is preferably relieved as at 51 so only the two longitudinally spaced points or rails 52 of the cradle are adapted to engage face 50. In order to reduce friction, a roller 53 may be supported by leg 15 and have rolling contact with the outer rail 52. A thumb nut 54 may be screwed on the roller shaft or stud 55 and serve to hold a retaining plate 56 against the side face of cradle 47 to aid in positioning the cradle on the head.

While the precise nature of the bearing between vertical leg 16 and trunnion 48 is not essential to the invention, considered in its broader aspects, the illustrated structure has certain features of utility and novelty and therefore will be described with some detail. Shrunk on or otherwise suitably fastened to trunnion 48 is a sleeve 57, preferably of bronze, the sleeve preferably having an annular flange 58 pressed against the outer face of side 47, which flange provides a thrust bearing between said side and the vertical leg. Slipped over sleeve 57 is a brass bushing 59 which has projections 60 and recesses 61 which are complementary to projections 41 and recess 40, respectively. One end of bushing 59 is angularly cut as at 62 and an expansible, split friction ring 63 has a conical face 64 complementary to and adapted to engage face 62. Ring 63 is preferably split as at 65 and peripherally weakened by notches 66 to render it more readily capable of radial expansion and contraction. Preferably, also, ring 63 is of brass or other suitable bearing material. An adjustable lock collar 67 is threaded on sleeve 57 at 68 and may be provided with radially extending holes 68$^a$ whereby turning bars may be applied to the collar or nut for adjusting it threadably along the sleeve. By threading the nut towards ring 63, it will be seen that the conical faces 64 and 62 are pressed against one another and ring 63 is thereby readily contracted and pressed with greater force against the periphery of sleeve 57. The bearing assembly so far described is lowered into the leg portion of the clamping box after cap 37 has been thrown back about hinge 38, the complementary annular rings and recesses of the sleeve and box being in register with one another. Cap 37 is then swung shut and clamp 39 utilized to draw it tightly into place. Bushing 59 is thus clamped tightly to leg 15 so as to be incapable of rotation with respect thereto, the registering projections and recesses holding the bushing and hence the entire trunnion and adapter against movement in the direction of the axis of said trunnion. Sleeve 57 then has bearing within bushing 59 and nut or collar 67 is adjusted until ring 63 effects the desired amount of frictional drag between the sleeve or trunnion and the stationary part of the bearing.

Operating handle 69, which may be longitudinally extensible or collapsible, as made apparent in Fig. 3, has a tubular hub 70 adapted to be releasably secured to trunnion 48 or the outer end of sleeve 57 by clamp screw 71. A split gear segment 72, preferably of the conventionally illustrated spring take-up type is secured to side 47, one half 73 of the gear being adjusted to be swung against the tension of spring 74 when the adapter is lowered into operative association with the head at which time the two halves 73 and 73$^a$ of the gear engage pinion 33. Handle 75 is fixed to gear half 73 and utilized for thus rotating it against the action of the spring. As soon as the two halves of the gear are in mesh with pinion 33, handle 75 may be released, the pinion thereafter holding the two gear halves against relative movement except to the extent that spring 74 moves half 73 in a manner to take up all lost motion between pinion and gear, with obvious advantage.

The cradle 46 has a side 76 opposite side 47, there preferably being bracing ribs 77 between the two sides, and integral with side 76 is a vertical, tubular hub 78, the extending axes of trunnion 48 and hub 78 preferably intersecting at right angles. Tightly fitted to the upper face of hub 78 is an annular ring 79 having external screw threads 80.

Ring 79 provides means whereby a usual camera connector 81 (Fig. 2) may be threadably connected to hub 78, said connector having the usual tilting and panoraming devices conventionally illustrated at 82 and adapted to support the camera in the manner conventionally illustrated at 83. It will be noted that connector 81 overhangs the cradle portion of the adapter.

Referring to Fig. 2, it will be seen that rotation of trunnion 48 by force exerted on handle 69 swings the adapter and hence the camera about a horizontal axis, and that during this movement gears 72, 73 engage pinion 33 in a manner to operate gear train 31 and fly wheel 32 which thereupon act to steady the rotary movement of the adapter and camera about said axis. On the other hand, when handle 69 is swung in a manner to rotate the head, as a whole, about shaft 12, pinion 27 engages gear 13 in a manner to operate gear train 25 which thereby functions to steady the movement of the head, adapter and camera.

In certain instances, it is desirable that the camera be brought more nearly over shaft 12 than is possible when connection is made directly through hub 78, and for this purpose, I have devised a connector indicated generally at 45. This connector comprises a substantialy rectangular frame made up of bottom 84, ends 85 and top or bed 86, the latter being prepared in any suitable manner, as, for instance, by providing a chanel 87, for the reception of camera C. Preferably, this camera or parts thereof are slidable through the channel in a manner well known to those skilled in the art. Bottom 84 has an offset, depending annular flange 88 which is adapted to fit over ring 79, though not adapted to become threadably engaged therewith, said ring serving to position the connector except as regards its rotation. A clamping screw 89 is then thrust through a plate 90, which bears against the lower end of hub 78, and is threadably connected at 91 to boss 92 on bottom 84, said boss being concentric with flange 88. By swinging the connector into proper position and then taking-up clamp screw 89, it will be seen that the connector is drawn down tightly to hub 78 and held rigidly against movement in all directions.

Due to the off-setting of flange 80, it will be seen that the connector is brought well over cradle 46, it following that bed 86 is in such position that camera C may be moved horizontally into a position where it very nearly overlies shaft 12, thus bringing the entire assembly into balance. However, the extent the points of bearing between the adapter and the head are such that there is no likelihood of binding action occurring during swinging of the adapter, even though the camera be considerably off center.

From the above, it will be seen that I have provided an adapter whereby cameras of any standard construction may be substituted for the cylindrical camera usually employed with a head of this nature, so all the features of said standard camera may be taken advantage of as may also be all the features of the head and its steadying devices.

It will be understood the drawings and description are to be considered merely as illustrative of and not restrictive on the broader claims appended hereto, for various changes in design, structure and arrangement may be made without departing from the spirit and scope of said claims.

I claim:

1. In combination, a head mounted for rotation about a vertical axis, means for steadying such movement of the head, an adapter mounted in the head for rotation about a horizontal axis and adapted to support a camera, and means in the head and operatively connected to the adapter to steady the movement of the adapter about said horizontal axis; said adapter embodying a cradle, and a trunnion concentric with the arcuate face of the cradle, said trunnion having bearing in the head and the arcuate face of the cradle having bearing on a complementary surface on the head.

2. In combination, a head mounted for rotation about a vertical axis, means for steadying such movement of the head, an adapter mounted in the head for rotation about a horizontal axis and adapted to support a camera, means in the head and operatively connected to the adapter to steady the movement of the adapter about said horizontal axis, and adjustable, friction means between the adapter and head adapted to be operated to impose a variable resistance to the rotary movement of the adapter about said horizontal axis.

In witness that I claim the foregoing I have hereunto subscribed my name this 20th day of October, 1926.

ARMIN FRIED.